United States Patent Office 3,494,968
Patented Feb. 10, 1970

3,494,968
STABILIZATION OF 1,1,1-TRICHLOROETHANE
Wesley L. Archer, Midland, and Elbert L. Simpson, Auburn, Mich., assignors to The Dow Chemical Company, Midland, Mich., a corporation of Delaware
No Drawing. Continuation-in-part of application Ser. No. 687,106, Dec. 1, 1967. This application July 17, 1968, Ser. No. 745,398
Int. Cl. C07c 17/42
U.S. Cl. 260—652.5                    2 Claims

ABSTRACT OF THE DISCLOSURE

The reaction of 1,1,1-trichloroethane with aluminum is inhibited by the presence in the 1,1,1-trichloroethane of a small amount of dissolved-2-(1-aziridinyl)-2-oxazoline. Concentrations of the order of 0.01–1 gram mole per liter provide significant inhibition.

Cross reference to related applications

This is a continuation-in-part of copending application Ser. No. 687,106 filed Dec. 1, 1967, now abandoned.

Background of the invention

This invention relates to the stabilization of chlorinated solvents. More particularly, the present invention concerns the stabilization of 1,1,1-trichloroethane in the presence of metallic aluminum.

Chlorinated hydrocarbons such as trichloroethylene and perchloroethylene are commonly used as solvents in chemical processes, dry cleaning, and metal degreasing. Solvents of this type are subject to slow decomposition and oxidation reactions, particularly in the presence of impurities such as water, traces of acid or metal salts. Corrosion of metal surfaces in containers and process equipment and deterioration of solvent quality by formation of acidic and colored byproducts thereby become serious problems. Inhibitors such as acid scavengers and antioxidants are commonly added to these solvents in order to prevent such degradative reactions. Inhibitor concentrations are normally of the order of one percent by weight or less.

1,1,1-trichloroethane poses a different and particularly difficult stabilization problem because of its unusual reactivity with certain metals, notably aluminum. Traces of metal salts, moisture, or other impurities are not needed to initiate the 1,1,1-trichloroethane-aluminum reaction, for this reaction occurs spontaneously on a freshly exposed aluminum surface with spectacular results, converting the solvent and the metal surface in a few minutes to a blackened mass of acidic, carbonaceous material and aluminum salts. Conventional acid acceptor stabilizers cannot be depended upon to inhibit the aluminum-1,1,1-trichloroethane reaction and suitable inhibitors must be discovered by independent investigation. The search has yielded few effective compounds and these show little or no obvious pattern of structure. Typical 1,1,1-trichloroethane formulations contain about five percent by weight of inhibitor which is usually a combination of compounds to inhibit reaction of the solvent with a variety of metals.

Summary of the invention

It has now been found that the 1,1,1-trichloroethane-aluminum reaction can be substantially retarded or prevented by incorporating into the 1,1,1-trichloroethane an inhibiting amount of an oxazoline compound of the formula

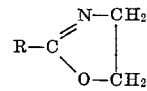

wherein R is an alkyl radical of 1–4 carbon atoms, a phenyl radical, a tolyl radical, or a 1-aziridinyl radical. Such compounds may be used alone or in any combination with each other or with other non-reactive conventional inhibitors.

Detailed description

Only a quantity of oxazoline compound sufficient to retard or to stop the reaction of aluminum and 1,1,1-trichloroethane need be used. Although any significant amount will provide some inhibition, preferably about 0.01–1 gram mole per liter of 1,1,1-trichloroethane composition is employed and about 0.01–0.1 gram mole is usually most preferred.

Oxazoline compounds as defined by the general formula set forth above were tested for inhibiting activity in elongated glass test tubes having an inside diameter of 0.8 cm. and 33 cm. in length. To each vertically disposed tube there was added 0.54 g. of essentially pure 16–32 mesh granular aluminum and a solution of the inhibitor in purified 1,1,1-trichloroethane to make a total volume of test mixture of 5 ml. The closed ends of the test tubes were then immersed in an oil bath held at a temperature sufficient to maintain the 1,1,1-trichloroethane solution in each tube at a steady reflux. The results listed in the following examples indicate the minimum concentration of the inhibitor found effective to provide complete inhibition of the 1,1,1-trichloroethane-aluminum reaction for 24 hours under these conditions. Prevention of the reaction for this length of time under the described conditions indicates capacity for effective inhibition for an indefinite period.

Concentrations are given in gram moles per liter, this figure being convertible to weight percent by the equation $$\text{wt. percent} = \frac{(\text{moles/liter})(\text{mol. wt. of inhibitor})}{13.46}$$

For example, a concentration of 0.10 g. mole per liter of an inhibitor of molecular weight 134.6 is equal to 1.0 weight percent of that inhibitor.

| Example No. | Compound name | Effective concentration, gram mole per liter |
|---|---|---|
| 1 | 2-methyl-2-oxazoline | 0.07 |
| 2 | 2-phenyl-2-oxazoline | 0.06 |
| 3 | 2-(1-aziridinyl)-2-oxazoline | 0.03 |

Results similar to those shown above are obtained when the test procedure is repeated and the oxazoline compound is 2-ethyl-2-oxazoline, 2-tert-butyl-2-oxazoline, or 2-(p-tolyl)-2-oxazoline. Surprisingly, structurally closely related compounds such as 2,4-dimethyl-2-oxazoline, 5-methyl-isoxazole, and 3,5-dimethyl-isoxazole have relatively little inhibiting activity.

The compound 2-(1-aziridinyl)-2-oxazoline can be prepared by known procedures such as by heating 1,1'-carbonylbisaziridine at 60–100° C. in the presence of an alkali metal iodide or thiocyanate or by reacting 1,3-bis(2- chloroethyl)-urea with methanolic sodium hydroxide. These methods are described in detail in copending application Ser. No. 607,659 filed Jan. 6, 1967, owned by a common assignee, the disclosure of which application is incorporated herein by reference.

We claim:

1. 1,1,1-trichloroethane inhibited against reaction with aluminum by having dissolved therein a small but inhibiting amount of 2-(1-aziridinyl)-2-oxazaline.

2. The 1,1,1-trichloroethane composition of claim 1 wherein the oxazoline compound is present in a concentration of 0.01–1 gram mole per liter.

References Cited

UNITED STATES PATENTS

| | | | |
|---|---|---|---|
| 2,517,893 | 8/1950 | Larchar | 260—652.5 |
| 2,947,792 | 8/1960 | Skeeters | 260—652.5 |
| 3,198,806 | 8/1965 | Ham | 260—652.5 |

LEON ZITVER, Primary Examiner

MATTHEW M. JACOB, Assistant Examiner

U.S. Cl. X.R.

252—153